(12) United States Patent  
Petev et al.

(10) Patent No.: US 7,546,593 B2  
(45) Date of Patent: Jun. 9, 2009

(54) COMMON CLASS LOADERS

(75) Inventors: Petio G. Petev, Sofia (BG); Nikolai S. Dimitrov, Sofia (BG)

(73) Assignee: SAP AG, Walldorf (DE)

( * ) Notice: Subject to any disclaimer, the term of this patent is extended or adjusted under 35 U.S.C. 154(b) by 888 days.

(21) Appl. No.: 10/856,643

(22) Filed: May 28, 2004

(65) Prior Publication Data

US 2005/0268294 A1  Dec. 1, 2005

(51) Int. Cl.
G06F 9/44 (2006.01)

(52) U.S. Cl. .................................... 717/166; 719/332

(58) Field of Classification Search ............... 717/166
See application file for complete search history.

(56) References Cited

U.S. PATENT DOCUMENTS

| | | | | |
|---|---|---|---|---|
| 6,339,841 B1 * | 1/2002 | Merrick et al. | ............... | 717/166 |
| 6,470,494 B1 * | 10/2002 | Chan et al. | .................. | 717/166 |
| 6,681,242 B1 * | 1/2004 | Kumar et al. | ................ | 718/104 |
| 7,039,923 B2 * | 5/2006 | Kumar et al. | ................ | 719/331 |
| 7,051,324 B2 * | 5/2006 | Gissel et al. | ................. | 717/166 |
| 2003/0177484 A1 * | 9/2003 | Bosschaert et al. | ........... | 717/166 |
| 2005/0091644 A1 * | 4/2005 | Chilimbi | ...................... | 717/128 |
| 2006/0168567 A1 * | 7/2006 | Kressin et al. | .............. | 717/124 |

* cited by examiner

Primary Examiner—Lewis A Bullock, Jr.  
Assistant Examiner—Jue S Wang  
(74) Attorney, Agent, or Firm—Blakely Sokoloff Taylor & Zafman

(57) ABSTRACT

Embodiments include a system for loading components with complex intra-dependencies. Components in the system may be assigned at start up to a common loader module. The system detects reference cycles amongst the set of components in the system. All components in a reference cycle may be assigned for loading to the same common loader. This system avoids deadlock scenarios by identifying reference cycles at start up and assigning each cycle to a single common loader. The embodiments of the system also analyze components to be loaded that are identified after start up to determine if they cause a new reference cycle. Components that cause a new reference cycle may not be allowed to be loaded to prevent deadlock loading scenarios.

11 Claims, 6 Drawing Sheets

COMMON CLASS LOADERS

BACKGROUND

1. Field of the Invention

The embodiments of the invention relate to component loading. Specifically, embodiments of the invention relate to optimizations of a component loading system to group components with component loading modules to prevent deadlocking during resolutions of dependencies between components by component loading modules.

2. Background

A cluster system is utilized to provide a set of services and resources to a set of client computers. The cluster system includes a collection of server nodes and other components that are arranged to cooperatively perform computer-implemented tasks, such as providing client computers with access to the set of services and resources. A cluster system may be used in an enterprise software environment to handle a number of tasks in parallel. A cluster system is scalable and has the flexibility to enable additional cluster elements to be incorporated within or added to the existing cluster elements.

The cluster system is a client-server system that employs a multi-tiered architecture. In the multi-tiered system, presentation logic, business logic and a set of services and resources are logically separated from a user interface of an application. A client may execute a user interface. Other layers are moved off of the client to one or more dedicated servers on a network.

A multi-tiered architecture may be implemented using a variety of different application technologies at each of the layers of the multi-tier architecture, including those based on the Java 2 Enterprise Edition Specification created by Sun Microsystems, Santa Clara, Calif. ("J2EE"), the Microsoft .NET Framework created by Microsoft Corporation of Redmond, Wash. (".Net") and/or the Advanced Business Application Programming ("ABAP") standard developed by SAP AG. For example, in a J2EE environment, the business layer, which handles the core business logic of the application, is comprised of Enterprise Java Bean ("EJB") components with support for EJB containers. Within a J2EE environment, the presentation layer is responsible for generating servlets and Java Server Pages ("JSP") interpretable by different types of browsers at the user interface layer.

Many of these platforms provide inefficient loading schemes with rigid relationships between loading modules and application files. This rigid relationship prohibits cyclic dependencies between application files. This prohibition limits the ability of programmers to use direct references from one application file to other application files to use data and programs from those other files in the system. This rigid structure limits flexibility in programming and may force the use of redundant code. This rigid structure extends load times because loads of referenced files may require that a single or small set of loading modules be used that share a single thread to prevent deadlocks in file loading.

SUMMARY

Embodiments include a system for analyzing a set of references between components. The analysis may determine if any reference cycles are present in a set of components. Loader modules may be utilized to load components in the system. A loader manager module may detect reference cycles. In additional embodiments, if a reference cycle is detected, each member components in the reference cycle may be assigned to a single loader module.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 1:
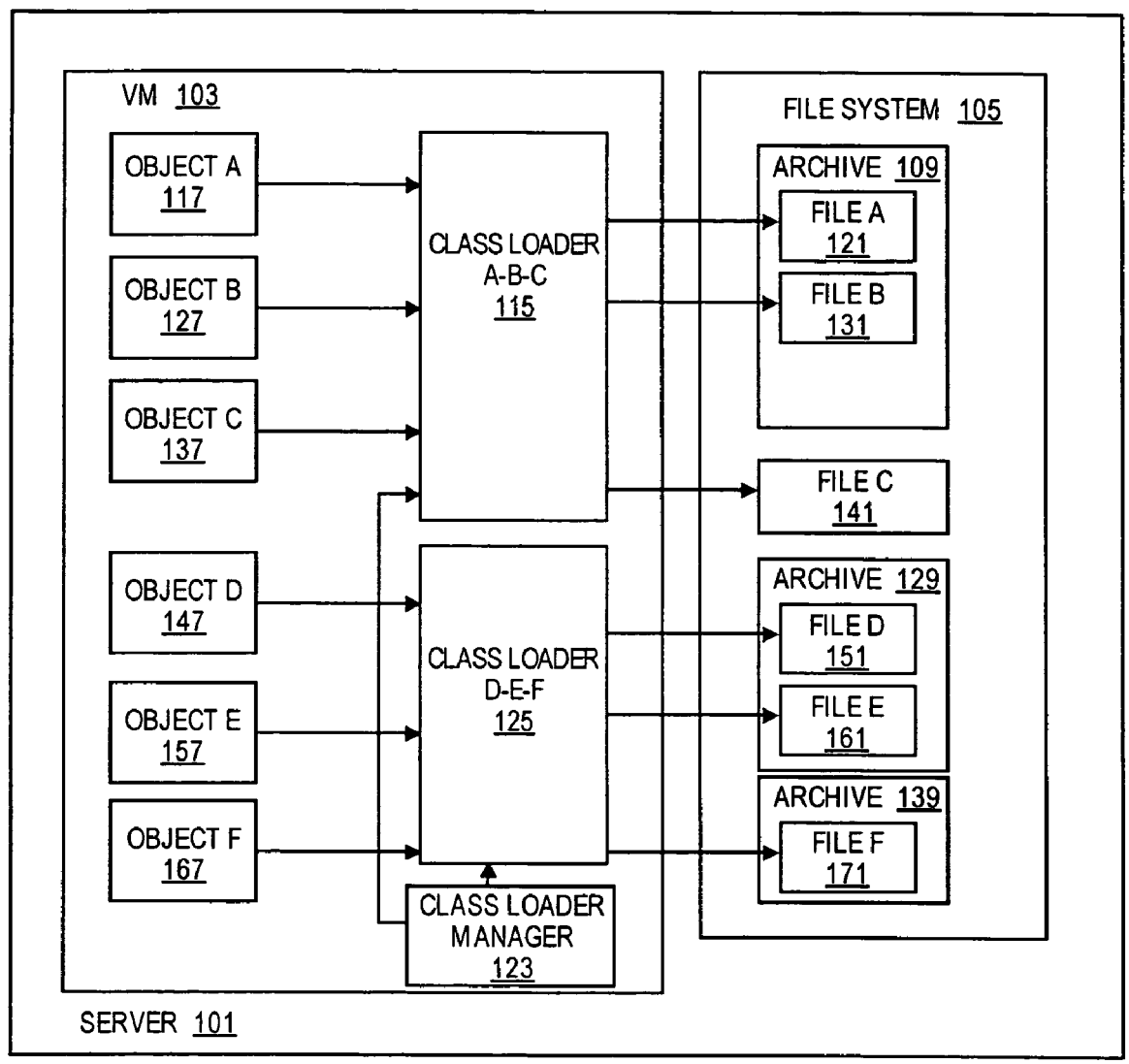
FIG. 1 is a block diagram of one embodiment of a component loading system.

FIG. 1 is one embodiment of a component loading system. As used herein a "component" may be a file, class, object, data structure or similar data that may be loaded an operating system, virtual machine, application or similar program. In one embodiment, the component loading system operates on a local machine to load components required by applications, services, virtual machines and similar programs. In one embodiment, the local machine is an application server 101. Application server 101 may provide access to services and resources for a set of clients. Clients may be remote computers, local applications, and similar programs local to application server 101 or remote from application server 101. In one embodiment, the services and resources provided by application server 101 may be applications and services related to enterprise software and resources.

In one embodiment, the local machine may have a file system 105. File system 105 may be used to organize and store components related to the applications and services provided by application server 101. In one embodiment, components stored by file system 105 may include archive files 119, 129. Archive files 119, 129 may be components that contain multiple files in a compressed or encrypted format. In one embodiment, archive files 119, 129 may be java archive files. A java archive file may be used to store a set of class files to be used to instantiate objects in a java virtual machine 103. Class files may be components that contain class definitions written in the java programming language. Classes may represent programs, data and data structures in an objected oriented format. In another embodiment, other types of archive files may be supported by the component loading system including zip files, software deployment archives, and similar archive files. In one embodiment, archive files 119, 129 may store other types of files including binary files, data, text files and similar file types. In one embodiment, file system 105 may store any type of file including archive files, binary files, text files, database files and similar file formats.

In one embodiment, the local machine may execute applications and services using a virtual machine 103 environment. Virtual machine 103 may be a java virtual machine such as a java virtual machine based on the Java 2 Enterprise Edition Specification ("J2EE") created by Sun Microsystems, Santa Clara, Calif., or similar virtual machine. Virtual machine 103 may support any number of applications and services including a component loading system. Applications, services and similar programs and modules may be executed by the local machine in the form of objects 117, 127, 137, 147, 157 and 167 or sets of objects.

In one embodiment, applications and services in the form of objects may be loaded by loader modules 115, 125 or a set of loader modules. A loader module may be a class loader 115, 125 or similar loading utility. In one embodiment, during operation a virtual machine 103 may invoke class loaders 115, 125 or a set of class loaders to open files and archives to retrieve the code of the applications and services to be executed by virtual machine 103. Opening components may involve decompressing a file or archive and performing security checks such as certificate checks or similar security checks. As a result, opening components may require significant processing or system time. Applications and services may be loaded from compiled binary files, code files and similar components to be executed or interpreted. A loader module or program may be used to retrieve data and instructions from the components. This loader program may open the component to read the data and instructions and resolve dependencies or references to other components.

For example, class loader 115 may load a class file 121 from java archive file 119 during system startup at the request of java virtual machine 103. The class loader may initiate a load of a referenced file. For example, file A 121 may reference file B 131. In one embodiment, components may be grouped with designated loader modules based on the membership of the component in a reference cycle. A "reference" may be an incorporation of data or code from another component by using a pointer, file name, or similar indicator of the other component to instruct a loader to retrieve the needed data or code from that component. The indicated component may include references that must then be resolved. A reference cycle may be a set of references amongst components that create a cycle where following a string of references amongst components leads back to the original components. For example, if a first component references a second component and the second component also references the first component, a reference cycle exists. Similarly, if a first component references a second, the second references a third, and the third references the first, the three components form a reference cycle. Components in reference cycles may be grouped and assigned to a single loader module or common loader module. Components that are not part of the reference cycle may be assigned to any loader module. For example, class loader 115 may be responsible for loading file A 121, file B 131, and file C 141 where file A 121, file B 131 and file C 141 form a reference cycle.

In one embodiment, the component loading system may include a loader manager to generate a set of loader modules and to assign component loading responsibilities to the loader modules. In one embodiment, a loader manager may be a class loader manager 123 that examines file dependencies and generates, invokes, instantiates or similarly initiates a set of class loaders and assigns a set of files to each one to load. A loader manager 123 may generate and maintain a mapping of component dependencies and references. In one embodiment, the loader manager may examine each component that an access request is made for that has not been assigned to a loader module. The loader manager may map the references of the component and search for reference cycles. The loader manager may then assign the component to a class loader module dependent on its membership in a reference cycle.

Figure 2A:
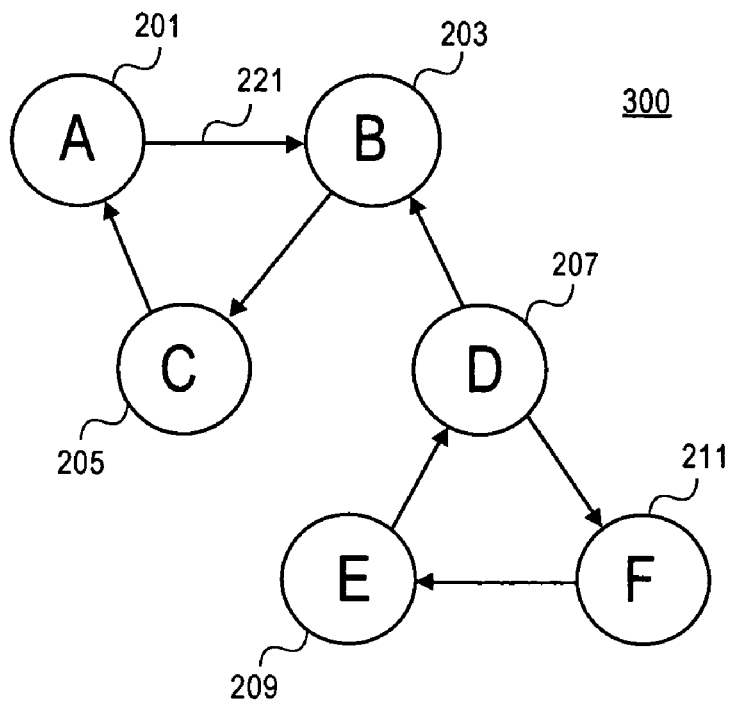
FIG. 2A is a diagram of one example of a set of component references.

FIG. 2A is a diagram of an example reference mapping supported by the component loading system. The reference mapping or graph may represent an example set of files A-F. Directional arrows indicate nodes in the graph indicate a dependency or reference. For example, file A 201 may have a reference 221 to file B 203. The example mapping may include two cycles. The first cycle may contain file A 201, file B 203 and file C 205. The second cycle may contain file D 207, file E 209 and file F 211. During an initial system start up or loading of files in a system, a loader manager may examine each of the files to be loaded in the system to determine their dependencies and references. The loader manager may generate a mapping to identify the reference cycles. For example, the loader manager may generate a first loader module to handle the reference cycle containing file A 201, file B 203 and file C 205. The loader manager may generate a second load module to handle the reference cycle containing file D 207, file E 209 and file F 211.

Figure 2B:
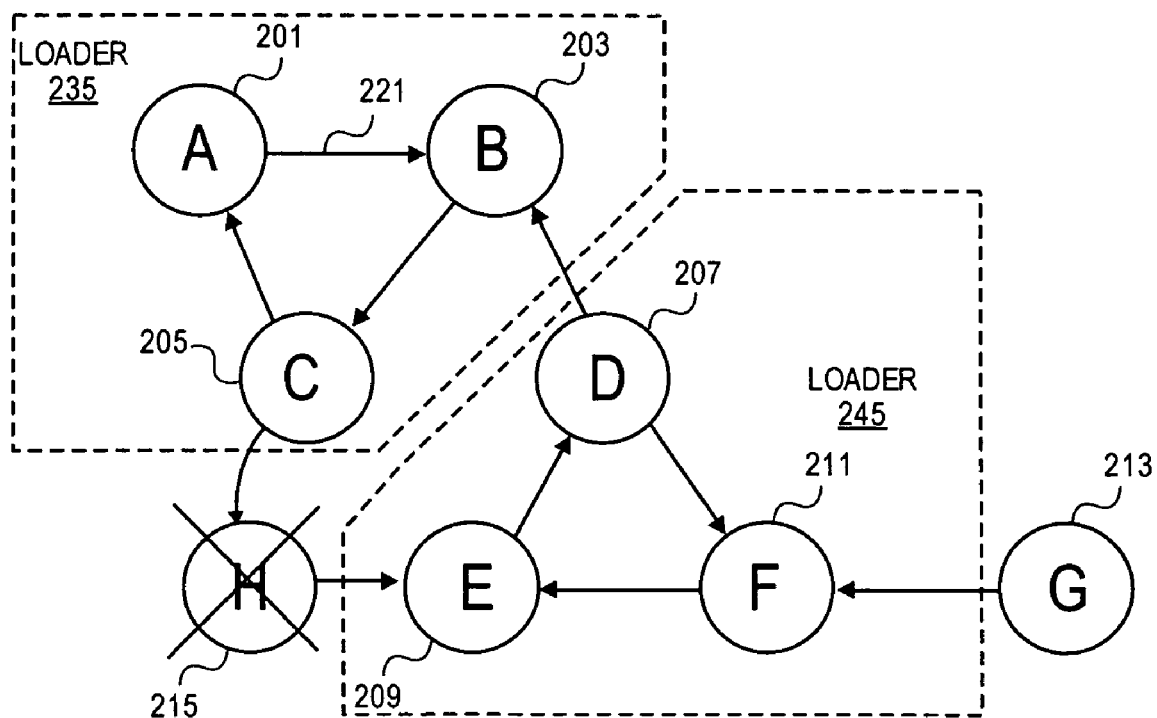
FIG. 2B is a diagram of the example set of component references of FIG. 2A where a new component has been added.

FIG. 2B is a diagram of an example of adding file references to a reference mapping. In this example a first loader 235 has been generated by a loader manager to handle the reference cycle including file A 201, file B 203 and file C 205. A second loader 245 has been generated by the loader manager to handle the reference cycle including file D 207, file E 29 and file F 211. In this example, an application, virtual machine or similar program has requested to load file H 215 and file G 213. The loader manager examines and maps the dependencies or references from file H 215 and file G 213. File H 215 is referred to by file C 205 and refers to file E 209. This results in a new reference cycle including file H 215, file C 205, file B 203, file D 207 and file E 209. The loader manager will prohibit the loading of file H 215 because it may result in a deadlock between loader modules when the references are resolved. The addition of file G 213 does not result in a new reference cycle. In one embodiment, the loading of file G 213 may be assigned to a new loader module or to loader module 245 or 235.

Figure 3:
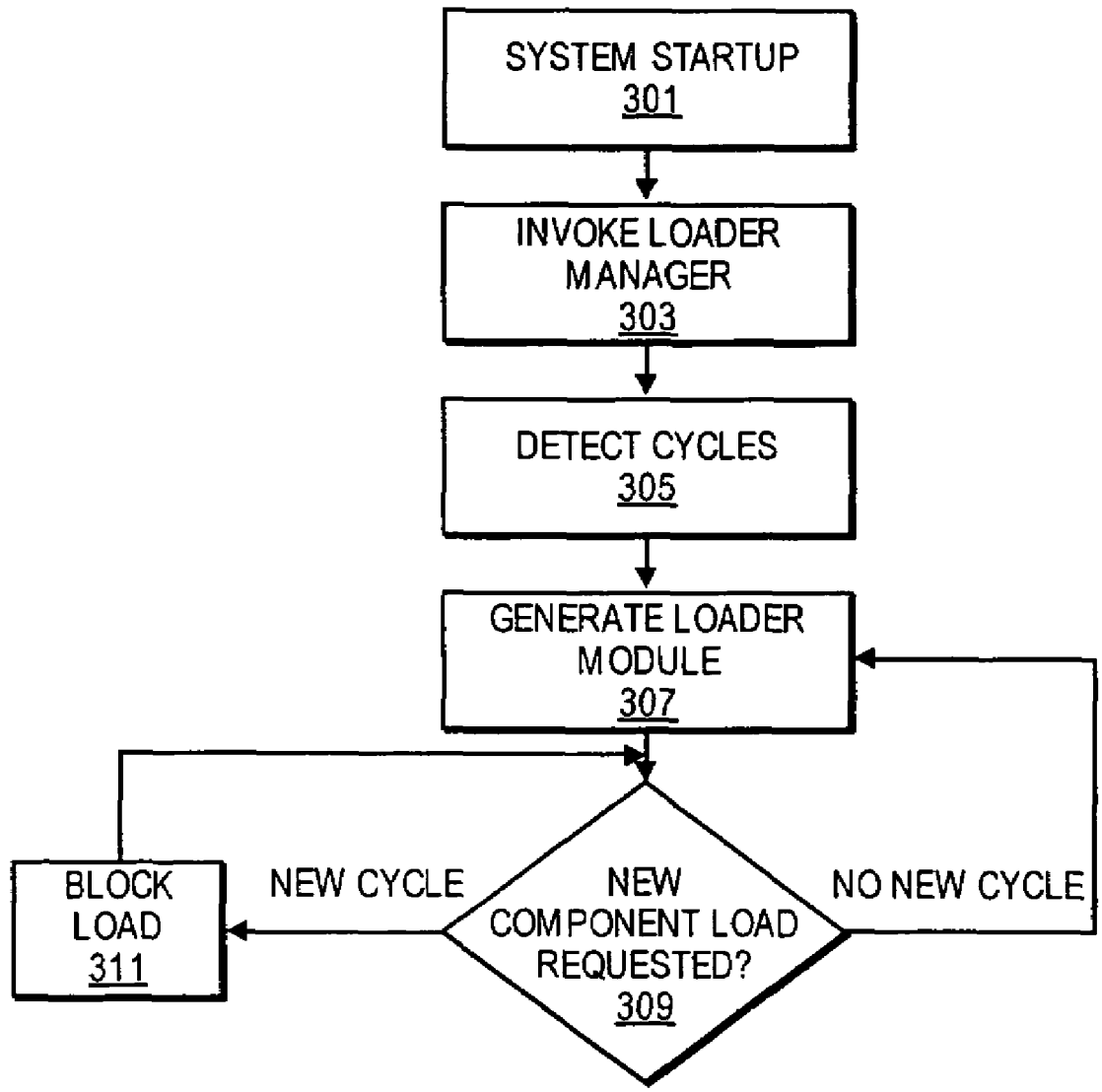
FIG. 3 is a flowchart of one embodiment of a process for generating a set of load modules.

FIG. 3 is a flowchart of one embodiment of a process for generating and monitoring a component loading system. In one embodiment, the component loading system may be initiated during system startup (block 301). A virtual machine, operating system or similar platform may initiate, instantiate, invoke or similarly start a loader manager to generate a set of loader modules to load applications, services and similar programs (block 303).

In one embodiment, the loader manager catalogs or similarly collects a list or set of components to be loaded by an operating system, virtual machine, application or similar program. The loader manager may then map the references in the components to be loaded and related components. The loader manager may parse or similarly examine each component to determine their dependencies or references to other components. The loader manager may then utilize any well known cycle detection algorithms to determine the presence and constituents of any reference cycles amongst the components to be loaded and their referenced components (block 305). In one embodiment, the cycle detection algorithm may be a depth first search algorithm.

In one embodiment, the loader manager may then generate a set of loader modules, or a set of loader modules may be generated by another application, the virtual machine or other program based on the reference cycles found by the loader manager (block 307). Each loader module that is generated may be assigned a set of components that it is responsible for loading when data may be requested from those components. In one embodiment, components that are part of a reference cycle may be assigned to a single loader module. Each reference cycle may have its own loader module. Other components that are not a part of a reference cycle may be assigned to any loader module including loader modules that are responsible for components in a reference cycle or additional loader modules.

In one embodiment, the loader manager continues to monitor for additional requests to load components after the initial startup and loader module generation sequence (block 309). Additional component loads may be requested dynamically during the main operating time of a virtual machine, application, or similar program. If adding a new component does not result in a new reference cycle then the component may be added to the responsibilities of an existing loader module or a new loader module may be invoked, instantiated, or similarly initiated by the loader manager or similar application. The detection, examination and management of new components to be loaded may continue until system shutdown.

In one embodiment, if a component or set of components to be loaded after initial start up generates a new reference cycle then the loader manager may block or prohibit the loading of the component or components (block 311). The loader manager may notify the requesting application of the failure of the load. The loader manager may continue to examine component load requests and check for new cycles. New cycles are not allowed by the loader manager to avoid deadlocks that may be caused by multiple loader modules where a first loader module holds a first component and attempts to load a second component that is referenced by the first while a second loader holds the second component and tries to load the first component which is referenced by the second component. Stated differently, two loader modules may hold separate components while requesting the component held by the other loader module resulting in deadlock. Grouping the components of the reference cycle together avoids deadlocks because a single loader module is handling the load of all references in the cycle which prevents multiple loader modules having locks on components other loader modules require. In one embodiment, the component loading system may be a system based on java virtual machine. The component loading systems may also meet the java specification requirements that a class loader use a single thread. Each class loader may have a thread and thereby comply with java specification requirements.

Figure 4:
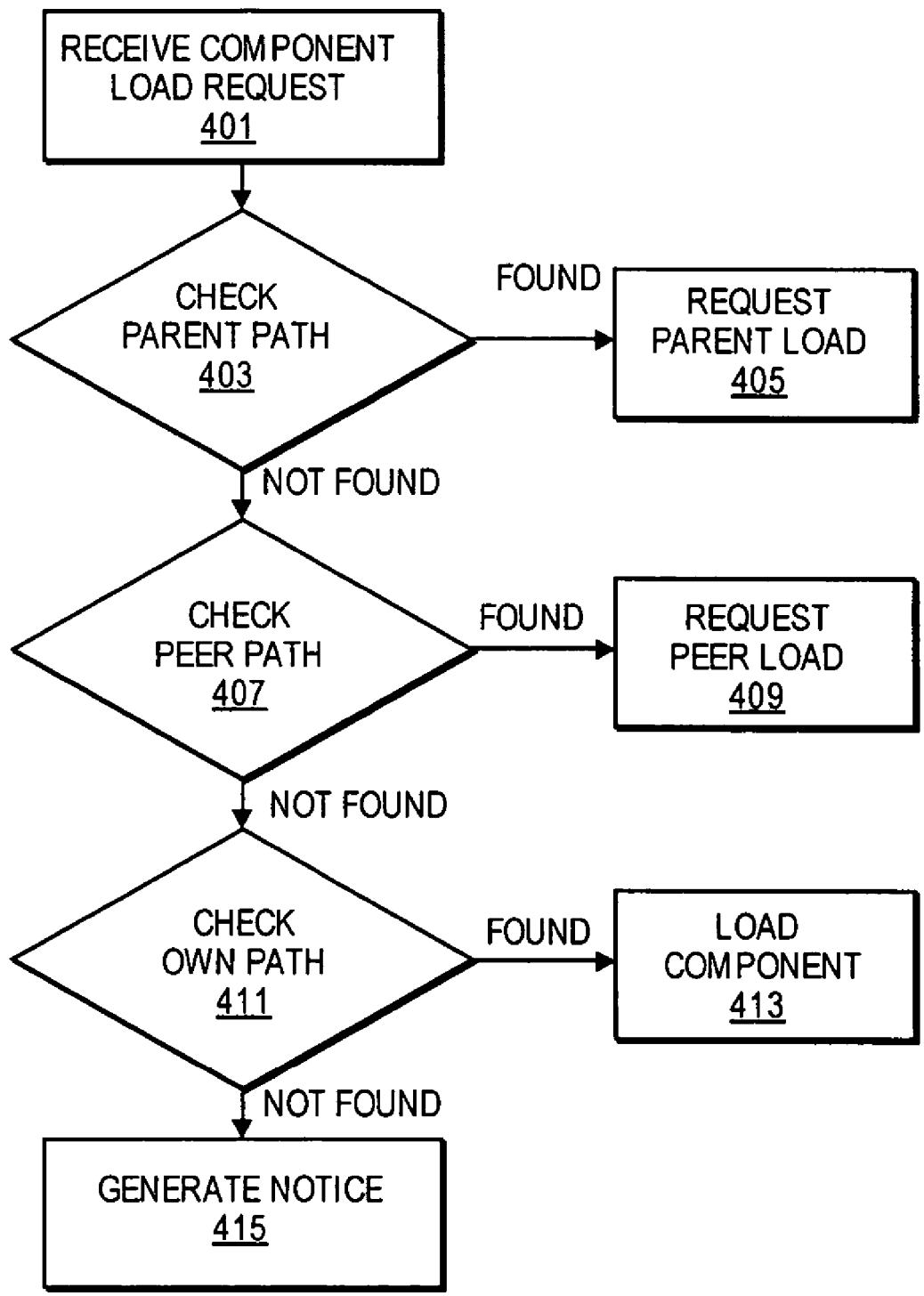
FIG. 4 is a flowchart of a process for resolving a reference in a component.

FIG. 4 is a flowchart of one embodiment of a process for loading components. In one embodiment, a loader module receives a request from a virtual machine, application, or other program to access data from a component (block 401). The request may contain an identifier for the component or data to be retrieved. The identifier may be a component name, path name or similar identifier of data or components. In one embodiment, the loader module may need to parse the input to determine the component name or path name.

In one embodiment, the loader module may invoke, call or similarly pass the request to a 'parent loader' module (block 403). The parent loader module may have responsibility for loading a specific set of components, these components may be core system components or a similar subset of components. The parent loader module may determine if it is responsible for loading a component by searching a set of pathnames, components or other indicators that the parent loader module has responsibility for loading. For example, in a java virtual machine environment a system loader may have responsibility for loading class files from the core java packages such as the java.* and javax.* packages. The system loader in the java virtual machine environment may be a parent loader to all other class loader modules. If a parent loader module is determined to be responsible for loading a requested component the parent loader may be called to load the component (block 405). The parent loader module may return requested data to the originally called loader module which may in turn return the data to the requesting program. In another embodiment, the requested data may be directly or indirectly returned by the parent loader module using any return means or intermediate data structure or device.

In one embodiment, if the parent loader module is determined not to have responsibility for loading a component then the loader module may invoke, call or similarly pass the request to a set of peer loader modules (block 407). A peer loader module may be any non parent loader module. Each peer loader module may have a set of pathnames, component names or similar indicators that it is responsible for loading. Each peer loader module may check its set of indicators against the received request and return a positive or negative acknowledgement to the original loader module. If a peer loader module is found to have responsibility for loading the requested component or data, that peer loader may load the requested component and return the data to the original loader module which may then return the data to the requesting program (block 409). In another embodiment, the peer loader modules may use any return means or intermediate data structure or device.

In one embodiment, if the parent and peer loader modules are not determined to have responsibility for loading a component then the loader module may check its own paths or sets of indicators to determine if it has responsibility for loading the requested component (block 411). If the loader module does have responsibility for loading the component it may load the requested data and return it to the requesting program (block 413). The loader module may utilize any return process or intermediate data structure or device to return the data to the requesting program. If the loader module does not have responsibility for loading the requested component or data then the loader module may generate a notification or other return data that indicates that the load was unsuccessful, the component could not be found or similar notification or return data for the requesting program (block 415).

In another embodiment, the process of determining loader module responsibility may be ordered in any manner that is logically complete in searching the possible loading modules to determine the responsible loader module. FIG. 4 is an example embodiment of a top down approach. Other approaches such as a bottom up, distributed or similar approach may be used.

Figure 5:
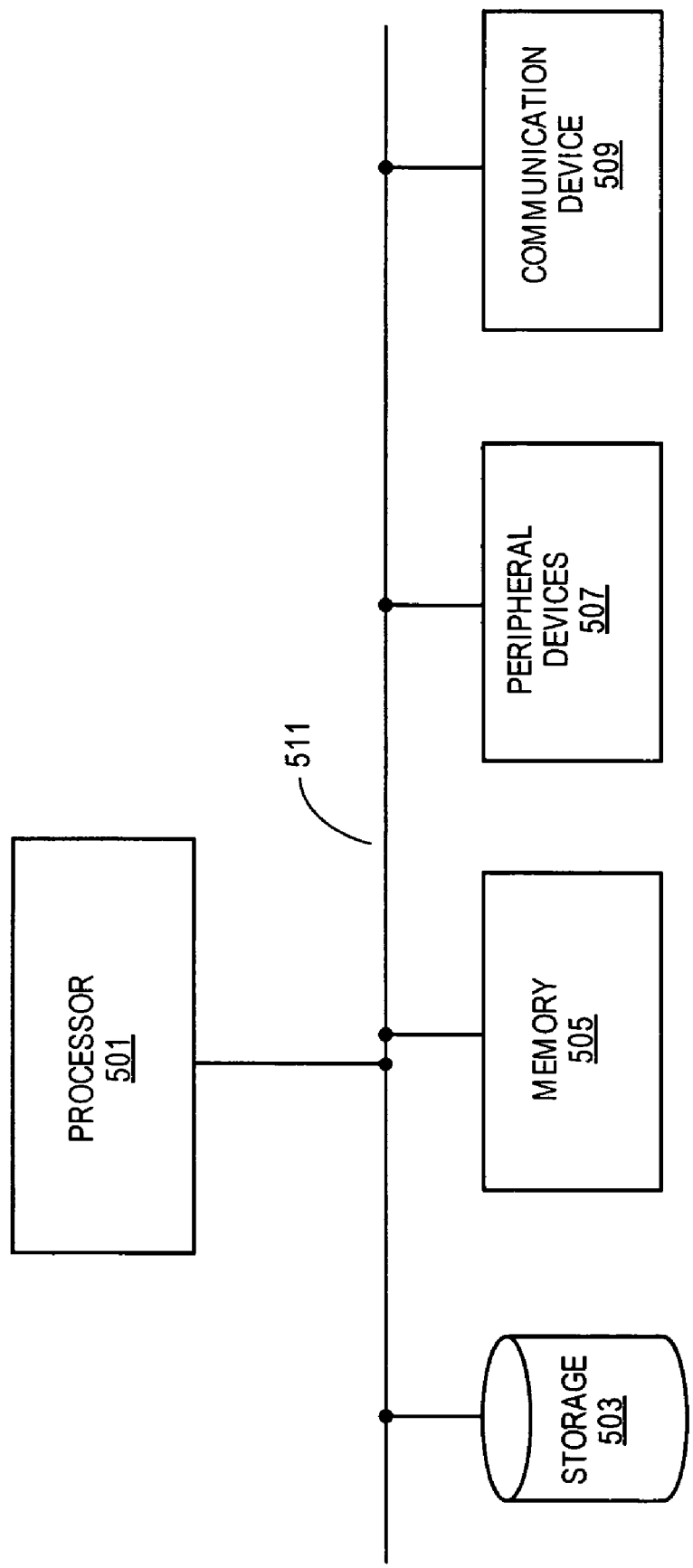
FIG. 5 is a diagram of a computer system running the component loading system.

FIG. 5 is a block diagram of an example computer system for executing the component loading system. In one embodiment, the computer system may include a processor 501 or set of processors to execute the component loading system, virtual machine, applications, services and similar programs. The processor may be a general purpose processor, application specific integrated circuit (ASIC) or similar processor. Processor 501 may be in communication via a bus 511 or similar communication medium with a memory device 505. Memory device 505 may be a system memory device or set of devices such as double data rate (DDR) memory modules, synchronized dynamic random access memory (SDRAM) memory modules, flash memory modules, or similar memory devices. Memory device 505 may be utilized by processor 501 as a working memory to execute the virtual machine, applications, the file handling system and similar programs.

In one embodiment, the computer system may include a storage device 503. Storage device 503 may be a magnetic disk, optical storage medium, flash memory, or similar storage device. Storage device 503 may be utilized to store components. Storage device 503 may organize components in a file system. Stored components may include program files, file handling system files, class files, temporary components, index files and similar files and data structures. The computer system may also include a set of peripheral devices 507. Peripheral devices 507 may include input devices, sound system devices, graphics devices, display devices, auxiliary storage devices, or similar devices or systems utilized with a computer system.

In one embodiment, the computer system may include a communication device 509. Communication device 509 may be a networking device to allow the computer system and applications, services and similar programs to communicate with other computers, applications, services and similar programs. In one embodiment, communication device 509 may be utilized to communicate with a remote database and retrieve or receive components from the database.

Figure 6:
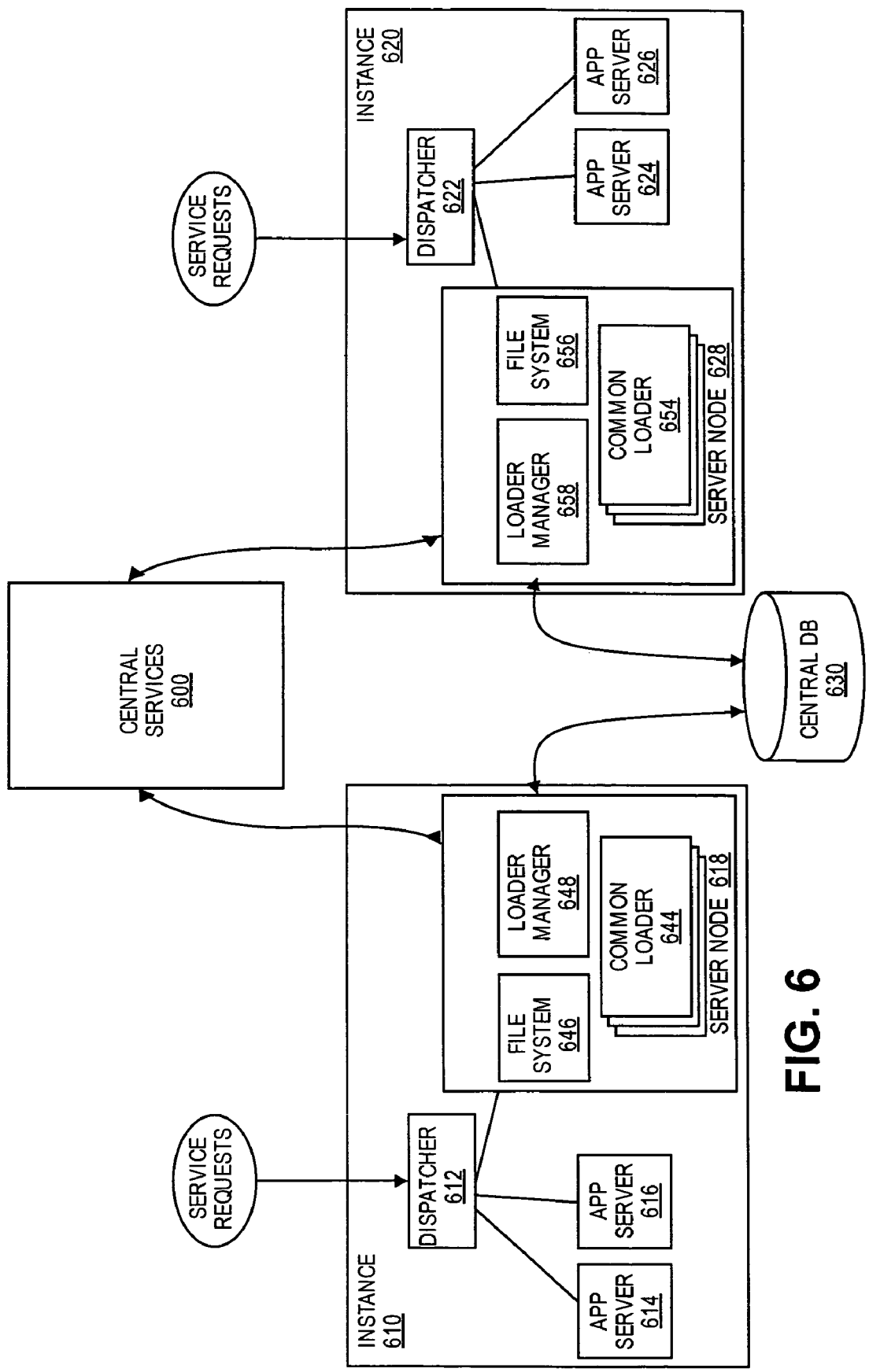
FIG. 6 is a diagram of one embodiment of a cluster system running the component loading system.

FIG. 6 is one embodiment of a cluster system that includes a component loading system. In one embodiment, the system architecture may include a central services instance 600 and a plurality of application server instances 610, 620. In one embodiment, the application servers are organized into groups referred to as "instances." Each instance includes a group of redundant application servers and a dispatcher for distributing service requests to each of the application servers. A group of instances may be organized as a "cluster." The application server instances, 610 and 620, may each include a group of application servers 614, 616, 618 and 624, 626, 628, respectively, and a dispatcher, 612, 622, respectively. The central services instance 600 may include a locking service, a messaging service, and similar services. The combination of the application server instances 610, 620 and the central services instance 600 may be the primary constituents of the cluster system. Although the following description will focus primarily on instance 610 for the purpose of explanation, the same principles and concepts may apply to other instances such as instance 620.

In one embodiment, the application servers 614, 616, 618 within instance 610 may provide business and/or presentation logic for the network applications supported by the cluster system. Each of application servers 614, 616 and 618 within a particular instance 610 may be configured with a redundant set of application logic and associated data. In one embodiment, dispatcher 612 distributes service requests from clients to one or more of application servers 614, 616 and 618 based on the load on each of the servers.

In one embodiment, application servers 614, 616 and 618 may be Java 2 Enterprise Edition ("J2EE") application servers which support Enterprise Java Bean ("EJB") components and EJB containers (at the business layer) and Servlets and Java Server Pages ("JSP") (at the presentation layer). In another embodiment, the cluster system, applications servers and component loading system may be implemented in the context of various other software platforms including, by way of example, Microsoft .NET platforms and/or the Advanced Business Application Programming ("ABAP") platforms developed by SAP AG.

In one embodiment, each application server may include a common loader module 644, 654 or set of common loader modules. Common loader modules 644, 654 may be utilized by applications, virtual machines and similar programs to access components needed by the applications, virtual machines and similar programs. Common loader modules 644, 654 may manage the retrieval of data from components stored in the file systems 646, 656 of each application server. Common loader modules 644, 654 may have responsibilities for loading a designated set of components and data. Each component that is part of the same reference cycle is assigned to the same common loader 644, 654. Components that are not part of a reference cycles may be assigned to any common loader. The reference cycle may be detected by a loader manager 648, 688. Common loaders 644, 654 may be generated by loader managers 648, 658 and assigned a set of components to load based on the detected reference cycles. The relationship between components and the common loaders is dynamically determined at start up. This system allows greater flexibility in inter-component dependencies while avoiding deadlock scenarios.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

The invention claimed is:

1. A method for a component loading system, the method comprising:
    generating a plurality of loader modules to load components;
    analyzing a set of components to determine a set of references between members of the set of components;
    identifying a reference cycle in the set of references, the reference cycle spanning a subset of members of the set of components beginning and ending with the same member within the subset of members;
    assigning load responsibility for the subset of members of the set of components spanned by the identified reference cycle to a single common component loader of the plurality of loader modules;
    after an initial period, monitoring dynamic component load requests to load new components for which load responsibility has not yet been assigned;
    determining that a first component load request would result in a new reference cycle, the new reference cycle spanning a different subset of members of the set of components than spanned by the previously identified reference cycle;
    prohibiting the first component load request that would result in the new reference cycle; and
    permitting a second component load request that was determined not to result in the new reference cycle, including assigning load responsibility for the new component requested in the second component load request to another one of the plurality of loader modules or to the previously assigned single common component loader.

2. The method of claim 1, further comprising:
    loading the subset of members of the set of components spanned by the identified reference cycle into a virtual machine using the assigned single common component loader.

3. The method of claim 1, wherein analyzing comprises:
    parsing class files from the set of components.

4. The method of claim 1, wherein the assigned single common component loader of the plurality of loader modules comprises:
    a class loader.

5. A component loading system comprising:
    a server having a loader manager to generate a plurality of loader modules for loading components of an application running on the server; and
    a processor on the server in which to execute the loader manager, wherein the loader manager analyzes a set of components of the application to determine a set of references between members of the set of components,
identifies a reference cycle in the set of references, the reference cycle spanning a subset of members of the set of components beginning and ending with the same member within the subset of members, and
assigns load responsibility for the subset of members of the set of components spanned by the identified reference cycle to a single common component loader of the plurality of loader modules; and
further wherein the server is to process a load request from a client for a service provided by the server, in response to which the loader manager is to analyze any new components of the load request for which load responsibility has not yet been assigned to determine whether the load request would result in a new reference cycle, the new reference cycle spanning a different subset of members of the set of components than spanned by previously identified reference cycles, to prohibit the load request if it would result in the new reference cycle, and to permit the load request if it would not result in the new reference cycle, wherein to permit the load request includes to assign load responsibility for the new components to another one of the plurality of loader modules or to the previously assigned single common component loader.

6. The system of claim 5 further comprising:
a java virtual machine operable on the server in which to load the subset of members of the set of components spanned by the identified reference cycle using the assigned single common component loader, the java virtual machine executing the application on the server.

7. An apparatus comprising:
means for running an application on a server;
means for generating a plurality of loader modules to load components of the application running on the server;
means for storing the plurality of loader modules on the server;
means for analyzing a set of components to determine a set of references between members of the set of components;
means for identifying a reference cycle in the set of references, the reference cycle spanning a subset of members of the set of components beginning and ending with the same member within the subset of members;
means for assigning to a single common component loader of the plurality of loader modules responsibility for loading the subset of members of the set of components spanned by the identified reference cycle;
means for monitoring dynamic component load requests to load new components for which load responsibility has not yet been assigned;
means for determining that a first component load request would result in a new reference cycle, the new reference cycle spanning a different subset of members of the set of components than spanned by the previously identified reference cycle;
means for prohibiting the first component load request that would result in the new reference cycle; and
means for permitting a second component load request that was determined not to result in the new reference cycle, including means for assigning load responsibility for the new component requested in the second component load request to another one of the plurality of loader modules or to the previously assigned single common component loader.

8. The apparatus of claim 7, further comprising:
means for returning loaded data for the subset of members of the set of components spanned by the identified reference cycle to a virtual machine.

9. The apparatus of claim 7, further comprising:
means for storing the set of components in a java archive file.

10. A machine readable medium having instructions stored therein which when executed cause a machine to perform a set of operations comprising:
generating a plurality of loader modules to load components;
parsing a component to determine a reference to another component;
identifying whether any of the determined references forms a reference cycle, the reference cycle spanning a string of components beginning and ending with the same component;
assigning load responsibility for the string of components spanned in the reference cycle to a single loader of the plurality of loader modules;
after an initial start up period processing a load request to determine any additional references to components not previously determined;
identifying whether any of the determined additional references forms a new reference cycle, the new reference cycle spanning a different string of components than spanned by previously identified reference cycles;
prohibiting the load request if a the new reference cycle would be formed; and
permitting the load request if the new reference cycle would not be formed, including assigning load responsibility for any new components referenced by the determined additional references to a same or different single loader of the plurality of loader modules.

11. The machine readable medium of claim 10, further comprising:
returning data loaded from the component by the single loader to a virtual machine.

* * * * *